US006104313A

United States Patent [19]

Boyd, II

[11] Patent Number: 6,104,313

[45] Date of Patent: Aug. 15, 2000

[54] PORTABLE AUTOMATED FLAGMAN

[76] Inventor: John F. Boyd, II, 9700 Wenzel La., Fort Washington, Md. 20744

[21] Appl. No.: 09/371,517

[22] Filed: Aug. 10, 1999

Related U.S. Application Data

[60] Provisional application No. 60/096,221, Aug. 12, 1998.

[51] Int. Cl.[7] .................... B60Q 7/00

[52] U.S. Cl. .................... 340/908.1; 340/908; 340/925; 340/907; 116/63 R; 40/610

[58] Field of Search .................... 340/908, 925, 340/926, 932.1, 907, 908.1, 321; 40/610; 315/312; 359/515; 116/63 R; 351/239; 248/167

[56] References Cited

U.S. PATENT DOCUMENTS

| | | | |
|---|---|---|---|
| 2,462,343 | 2/1949 | Wohlgemuth | 340/825.16 |
| 2,669,705 | 2/1954 | Collins | 340/908 |
| 2,806,670 | 9/1957 | Straster | 248/167 |
| 2,829,362 | 4/1958 | Terrill | 340/908 |
| 2,907,998 | 10/1959 | Conly | 340/815.77 |
| 3,046,521 | 7/1962 | Cantwell et al. | 340/908 |
| 3,435,412 | 3/1969 | Bohrer, Sr. | 340/908 |
| 3,729,706 | 4/1973 | Hein | 340/908 |
| 4,857,921 | 8/1989 | McBride et al. | 340/912 |
| 4,992,788 | 2/1991 | Arnt | 340/908 |
| 5,276,424 | 1/1994 | Hegemenn | 340/321 |
| 5,422,638 | 6/1995 | Singer et al. | 340/908.1 |
| 5,450,811 | 9/1995 | Heiland | 116/63 R |
| 5,551,177 | 9/1996 | Cowgill et al. | 40/610 |
| 5,592,247 | 1/1997 | Trokel | 351/239 |
| 5,818,640 | 10/1998 | Watanabe et al. | 359/515 |
| 5,936,362 | 9/1999 | Alt et al. | 315/312 |
| 5,986,576 | 11/1999 | Armstrong | 340/908 |

*Primary Examiner*—Daniel J. Wu
*Assistant Examiner*—Phung Nguyen
*Attorney, Agent, or Firm*—Richard C. Litman

[57] ABSTRACT

A remotely controlled, portable, automated flagman includes a shaft rotatably supported by a housing containing the drive mechanism and control electronics to selectively turn the shaft such that a “stop” or a “slow” sign is displayed at the option of a user. The user controls the display of the “stop” and “slow” signs by a remote control unit. A tripod or other type of support structure is attached to the housing so as to support the traffic control sign at the proper height above the ground. The automated flagman of the present invention can take the place of a human flagman with a handheld sign in zones where temporary traffic control is needed.

11 Claims, 6 Drawing Sheets

PORTABLE AUTOMATED FLAGMAN

CROSS-REFERENCE TO RELATED APPLICATION

This application claims the benefit of U.S. Provisional Patent Application Serial No. 60/096,221, filed Aug. 12, 1998.

BACKGROUND OF THE INVENTION

1. Field of the Invention

The present invention relates to an automated, portable, traffic control device designed to replace a flagman who is usually responsible for directing traffic safely around obstructions which potentially bring opposing traffic into conflict.

2. Introduction and Description of Related Art

Flagmen are a common sight along roadways near the site of accidents or road construction that block a lane in the road that is normally open to traffic. On two lane roads especially, when an entire lane is blocked by an accident, road or other construction, or a tree trimming operation, and opposing traffic has to use the same lane, a flagman is positioned at each approach to the site of the blockage. The flagmen are in communication with each other via two-way radios or using hand signals, and each flagman carries a handheld sign with the word "stop" on one side and "slow" on the other. When one flagman displays the word "stop", i.e. the stop sign side of his handheld sign, the other flagman displays the word "slow" allowing traffic to safely proceed through the single open lane in a first direction. Periodically, the flagman displaying "slow" will switch to displaying "stop", and he/she will inform the other flagman, via the two-way radio or using hand signals, of the change to a "stop" display and of the description of the last vehicle that was allowed to proceed through the open lane. The other flagman will then switch to a "slow" display once the last vehicle clears the open lane, allowing traffic in the opposite direction to proceed safely through the open lane. This process is periodically repeated until the obstruction is cleared from the closed lane.

One drawback of the foregoing arrangement is that a sufficient number of trained personnel may not immediately be available, at an accident scene for example, to safely direct traffic around an obstruction. Also, the use of flagmen with handheld signs is labor intensive and a substantial monetary savings could be realized if the flagman with a handheld sign could be replaced by an inexpensive automated flagman.

Many devices for temporarily directing traffic around construction zones have been proposed in the prior art. However, these devices are generally rather large and are mounted on specialized trailers, thus requiring a vehicle to tow these devices to the location where they are to be used. The logistic difficulties in deploying the prior art signs makes them more suitable for situations where temporary traffic control is needed for relatively long durations. Also, the prior art signs are rather expensive with the result that only local or state governments, that have constant need for such devices, can justify the expense of buying the prior art devices. A construction crane operator or an excavating contractor, for example, who may occasionally have need for a traffic control device, could not justify the expense of purchasing the prior art devices. Therefore, the need persists in the art for a portable automated flagman that is small enough to be carried in emergency vehicles and construction machinery at all times, and that is sufficiently inexpensive such that users with only occasional need for traffic control devices can justify the purchase of the portable automated flagman.

Examples of the prior art traffic control devices alluded to above are seen in U.S. Pat. No. 4,992,788, issued to Rudolf P. Arndt on Feb. 12, 1991, U.S. Pat. No. 4,857,921, issued to William B. McBride et al. on Aug. 15, 1989, and U.S. Pat. No. 3,046,521, issued to Edward G. Cantwell et al. on Jul. 24, 1962. Arndt discloses a traffic control trailer with two sets of three-color traffic signals, one of which is height adjustable using hydraulic cylinders. McBride et al. also disclose a traffic control trailer with two sets of three-color traffic signals. Similarly, Cantwell et al. disclose a wheeled base which supports red and green traffic control lights.

U.S. Pat. No. 3,729,706, issued to George P. Hein on Apr. 24, 1973, discloses a remotely controlled flagging unit with a wheeled support. Remote communication with the flagging units is established through wires. Each flagging unit has a three-color traffic control light, a closed circuit television camera, and a speaker. The Hein device seems too bulky to be conveniently carried by an emergency vehicle such as a police cruiser.

U.S. Pat. No. 3,435,412, issued to Albert H. Bohrer, Sr. on Mar. 25, 1969, discloses an internally lighted transparent stop sign. U.S. Pat. No. 2,907,998, issued to Frank E. Conly on Oct. 6, 1959, and U.S. Pat. No. 2,669,705, issued to William Joseph Wheatland Collins on Feb. 16, 1954, disclose collapsible, portable signal lights for use by disabled vehicles to warn other drivers of the presence of the disabled vehicle on the road.

U.S. Pat. No. 2,829,362, issued to Frank Terrill on Apr. 1, 1958, discloses a remote controlled, portable traffic light having a stop light and a go light. Terrill uses radio control to remotely control the traffic light. U.S. Pat. No. 2,462,343, issued to Adolph J. Wohlgemuth on Feb. 22, 1949, discloses a remote control system for multiple street lights from a central location. The Wohlgemuth patent does not relate to portable devices.

The book "101 Unuseless Japanese Inventions—The Art of Chindogu," by Kenji Kawakami, Copyrighted in 1995, shows a handheld signal light with three red lights designed to cosmetically resemble a standard three-color traffic signal.

None of the prior art cited above show a remote controlled sign that rotates to selectively display the words "stop" or "slow". None of the above inventions and patents, taken either singly or in combination, is seen to describe the instant invention as claimed.

SUMMARY OF THE INVENTION

The present invention is directed to a remotely controlled, portable, automated flagman that can take the place of a flagman with a handheld sign in zones where temporary traffic control is needed. The invention includes a shaft rotatably supported by a housing containing the drive mechanism and control electronics to selectively turn the shaft such that a "stop" or a "slow" sign is displayed at the option of a user. The user controls the display of the "stop" and "slow" signs by a remote control unit. A tripod or other type of support structure is attached to the housing so as to support the traffic control sign at the proper height above the ground.

Accordingly, it is a principal object of the invention to provide an automated flagman to replace a human flagman with a handheld sign in zones where temporary traffic control is needed.

It is another object of the invention to provide a portable traffic control device that can conveniently be carried by emergency vehicles so as to be readily available in response to an immediate need for temporary traffic control in an emergency.

It is a further object of the invention to provide a portable traffic control device that can be remotely operated.

Still another object of the invention to provide a portable traffic control device that can operate fully automatically and autonomously.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
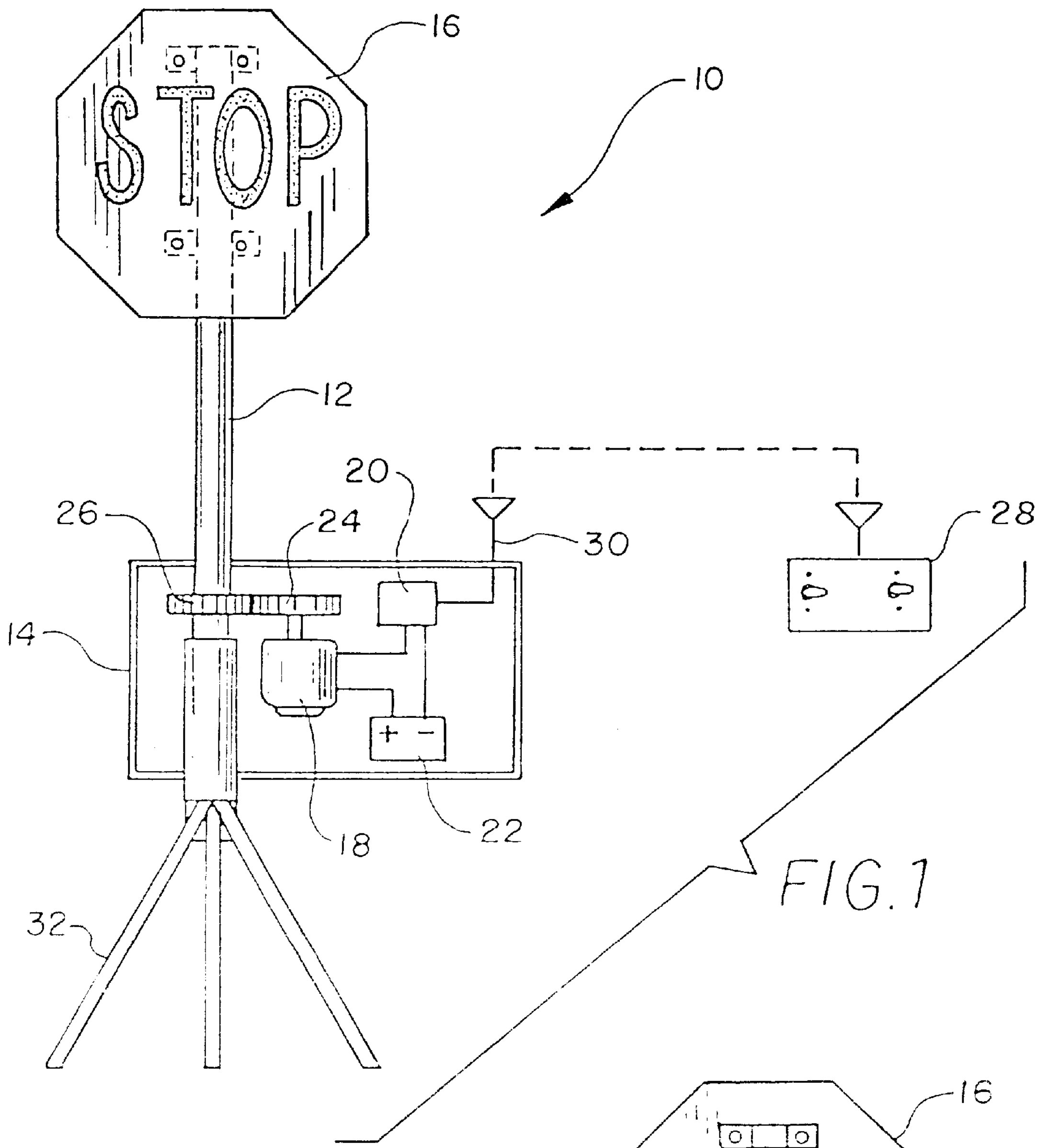
FIG. 1 is a schematic diagram of an automated flagman having an octagonal stop/slow sign.
Figure 2:
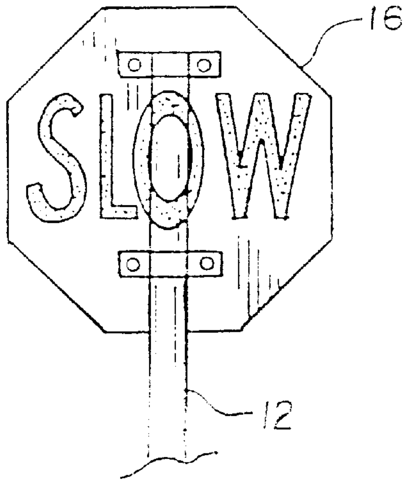
FIG. 2 is a fragmentary view showing the slow side of the octagonal stop/slow sign.

Referring now to FIGS. 1 and 2, the present invention is directed to a remotely controlled, portable, automated flagman 10 that can take the place of a human flagman with a handheld sign in zones where temporary traffic control is needed. The invention includes a shaft 12 rotatably supported by a housing 14 containing the drive mechanism and control electronics to selectively turn the shaft 12. A sign 16 with the word "stop" on one side and the word "slow" on the other side, is fixed to the shaft 12 so as to rotate as a unit with the shaft 12. In the embodiment illustrated in FIGS. 1 and 2, the sign 16 is an octagonal stop/slow sign.

The housing 14 houses a motor 18, control circuitry 20, and battery 22. Alternatively, the battery 22 may be external to housing 14 and connected to the circuitry within housing 14 by wires. The battery 22 would then be set on the housing 14 or on the ground. This type of arrangement would help reduce the size of the housing 14 resulting in a more compact and a more conveniently transported device.

The power output from the motor 18 is transmitted to the shaft 12 by gears 24 and 26, thus allowing the motor 18 to impart rotational motion to the shaft 12. Gears 24 and 26 form one example of power transmission means which are suitable for use in the present invention. Other examples of suitable power transmission means include chain and sprocket drives and belt drives. The control circuitry 20 receives control signals from a remote control unit 28. In the illustrated example, remote control is provided by radio waves. The control circuitry 20 receives control signals via an antenna 30.

The remote control unit 28 can for example be of the type used to control remote controlled model airplanes. In this case, the remote control unit 28 would have multiple channels with each channel controlling a separate automated flagman 10. Such remote control systems are well known in the art and will not be described in detail here. An example of an analog radio based remote control system, useable with the automated flagman of the present invention, is disclosed in U.S. Pat. No. 2,829,362, issued to Frank Terrill on Apr. 1, 1958, which is incorporated herein by reference.

As an alternative, an infra-red communications link, of the type used for remote control of household appliances, or a laser communications link, may be used for the remote control of the automated flagman 10. With these types of remote control system, the antenna 30 would be replaced by some type of photo-sensor housed behind a transparent window or within a transparent housing of some kind. Again such remote control systems are well known in the art and will not be discussed here in any detail.

In addition to analog systems, the remote control system of the automated flagman 10 can be of a digital type. In this type of system the handheld remote control unit 28 produces a digital code corresponding to a specific command. When this digital code is received by the circuitry 20, it is compared with a list of command codes in the resident Read Only Memory (ROM) of the circuitry 20, and the microprocessor in the circuitry 20 will execute the set of instructions identified by the command code received from the remote controlled unit 28. Such a set of commands may, for example, cause a control voltage to be applied to a signal line that closes a relay that energizes the motor 18 and causes the sign 16 to rotate. With this type of system a separate communications channel can be used for each automated flagman 10, or the same channel can be used for all the automated flagmen 10 deployed at a given site. When the same channel is used for all the automated flagmen 10, a digital identification code will be broadcast prior to the command code to activate the correct automated flagman 10. An example of this type of digital remote control system, which uses the same channel to control a plurality of devices, is shown in U.S. Pat. No. 4,857,921, issued to William B. McBride et al. on Aug. 15, 1989, also incorporated herein by reference.

In addition to wireless remote control systems, when distances permit, it is contemplated that in an alternative embodiment the remote control 28 is hard wired to the automated flagman 10. The term wireless as used herein means any remote control system that does not require a hard wire connection.

Preferably, the shaft 12 and the sign 16 can be disassembled from the housing 14 so that the device 10 can be made more compact for storage and transportation. For example, the shaft 12 can be made in two pieces, a first piece fixed to and adjacent to the gear 26 and a second piece fixed to the sign 16. The portion of the shaft adjacent the gear 26 would then terminate in a chuck or other clamping device such as a socket and thumbscrew arrangement. The portion of shaft 12 fixed to the sign 16 would then be clamped to the portion adjacent the gear 26 when preparing the device 10 for use. This arrangement has the added advantage that the standard handheld flagman's sign currently in use can be used as part of the device 10.

A tripod 32 or other type of support structure is attached to the housing 14 so as to support the traffic control sign at the proper height above the ground. The tripod 32 can be of any well known type that is collapsible while being sufficiently stable to prevent the automated flagman 10 from toppling in light or moderate breezes. Examples of suitable tripods for use as part of the device 10 include but are not limited to camera tripods, tripods used in surveyor's equipment, and machine gun tripods. Preferably the tripod 32 is detachable from the housing 14, again, so that the device 10 can be made more compact for storage and transportation. It would be well within the level of ordinary skill in the art to design a detachable mount for attaching the housing 14 to the tripod 32, therefore the details of the detachable mount for connecting the tripod 32 to the housing 14 will not be discussed herein. Alternatively, or as an added feature, the housing 14 can be adapted for placement on top of a plastic barrel of the type normally used to redirect traffic patterns in construction zones. additionally, the tripod 32 can have provision for mounting of the battery 22.

The remote control unit 28 is used to signal the motor 18 to rotate the sign 16 through 180° to switch the sign 16 from displaying "stop" to displaying "slow," if initially the sign was displaying "stop." To switch back the motor 18 and the control circuit 20 can be set up to rotate the sign 16 through 180° in the same direction as before or to rotate the sign 16 through 180° in the opposite direction, the ultimate result being the same in both cases.

Figure 3:
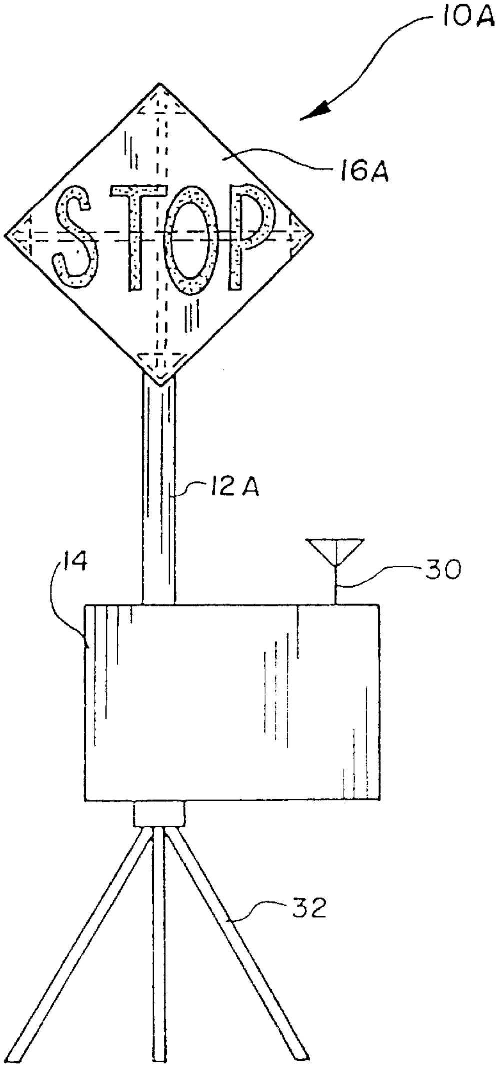
FIG. 3 is a diagrammatic depiction of the automated flagman of the present invention showing an alternative embodiment with a diamond-shaped stop/slow sign.
Figure 4:
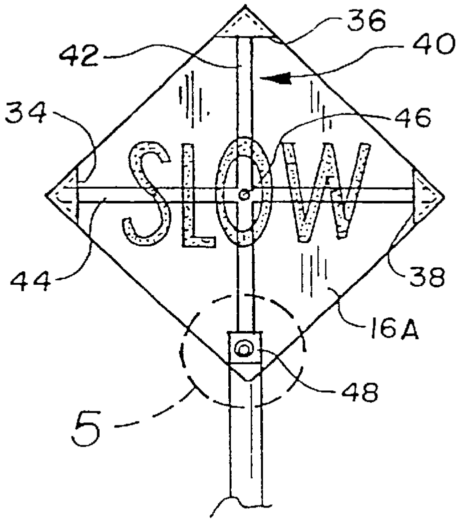
FIG. 4 is a fragmentary view showing details of the diamond-shaped stop/slow sign.
Figure 5:
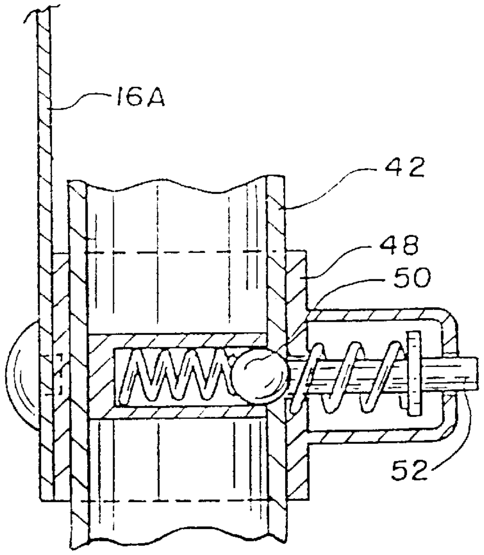
FIG. 5 is a fragmentary view showing details of the push-button snap used to hold one corner of the diamond-shaped stop/slow sign.

Referring to FIG. 3–5, an alternative embodiment 10*a* of the automated flagman having a fabric stop/slow sign 16*a* can be seen. The sign 16*a* is a diamond shaped piece of fabric with pockets 34, 36, and 38 at three of its corners. The sign 16*a* has "stop" on one side and "slow" on the other. A scissoring frame 40 is used to hold the sign 16*a* flat and spread out when the sign is deployed. The frame 40 is made of two elongated members 42 and 44 attached together so that they can pivot relative to one another. Member 44 is pivoted at its center, and the length of the member 42, extending from the pivot point 46 to the pocket 36, is equal to the lengths of the portion of the member 44 extending from the pivot point 46 to each of the respective pockets 34 and 38. The corner of the sign 16*a* not provided with a pocket is fixed to a sliding collar 48. The portion of the member 42 extending from the pivot point 46 toward the housing 14 is provided with a spring loaded ball bearing 50 which catches and holds the collar 48 at a distance from the pivot point 46 equal to the distance of the pockets 34, 36, and 38 from the pivot point 46. Thus when the ball bearing 50 catches the collar 48, the sign 16*a* will be stretched at all its four corners. A spring loaded push button 52 is used to push the ball bearing 50 out of engagement with the collar 48 in order to disassemble the sign 16*a*. The frame 40 is sufficiently flexible such that the members 42 and 44 can be deformed to fit into the pockets 34, 36, and 38 and the spring back to their original shape. This flexibility will greatly ease the assembly of the sign 16*a*. The portion of the member 42, supporting the sliding collar 48, extends beyond the position of the ball bearing 50 so as to provide an unobstructed portion that can be inserted into the shaft 12*a*. A well known clamping device of the type described previously in reference to the embodiment of FIGS. 1 and 2, can then be used to fix the member 42 to the shaft 12*a*. Alternatively, shaft 12*a* can be an extension of the member 42 and a clamping means can be provided adjacent the housing 14 at the output shaft of the gear 26. The pockets 34, 36, and 38 and the collar 48 collectively form an example of means for maintaining the woven fabric sheet 16*a* stretched over the frame 40. Alternatively, two fabric sheets similar to sheet 16*a*, each carrying a respective one of the words stop and slow, can be sewn together at least at three corners to form pockets that function in the same manner as pockets 34, 36, and 38. The lower corners of both sheets would then be attached to the collar 48.

To assemble the sign 16*a* the scissoring frame 40 is opened such that the members 42 and 44 are perpendicular. The collar 48 is then slid onto the portion of the member 42 supporting the ball bearing 50, and the collar 48 is slid up close to pivot point 46. The ends of the member 44 and the end of the member 42, on the side of the pivot 46 opposite the collar 48, are inserted into their respective pockets 34, 36, and 38. The collar 48 is then slid away from the pivot 46 until it catches the ball bearing 50. To disassemble the sign 16*a* these steps are simply reversed.

Figure 6:
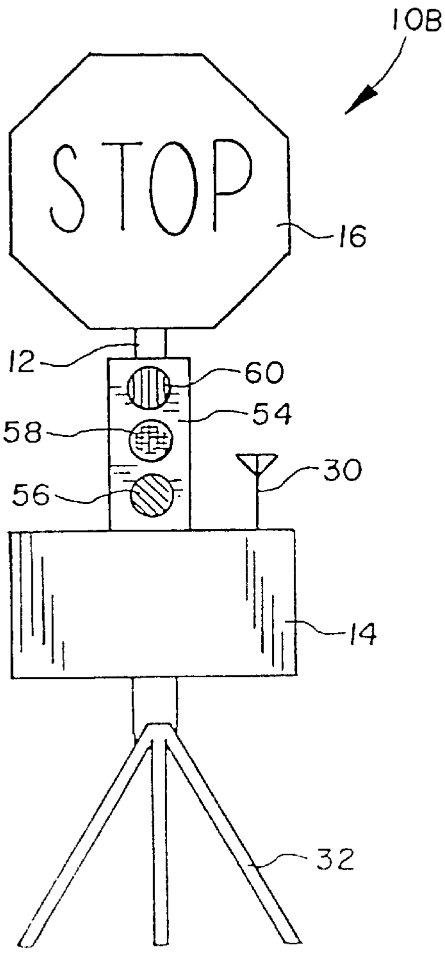
FIG. 6 is a diagrammatic depiction of the automated flagman of the present invention showing an alternative embodiment with a three-color traffic control light incorporated in the automated flagman.

Referring to FIG. 6, a second alternative embodiment 10*b* of the automated flagman can be seen. The automated flagman 10*b* differs from the embodiment 10 only in that a set of three colored traffic lights 54 is added to the embodiment 10*b*. The traffic light 54 includes a green light 56, an amber light 58, and a red light 60. The operation of the traffic light 54, its construction, and its control circuitry are well known in the art and will not be discussed in detail here. The light 54 is controlled by the same remote control signal that controls the sign 16. The operation of the traffic light 54 is coordinated with the sign 16 such that the red light 60 and the "stop" side of the sign 16 are displayed at the same time, while the amber and green lights 58 and 56 are displayed at the same time as the "slow" side of the sign 16. The green light 56 is normally displayed while the "slow" side of the sign 16 is also displayed. The amber light 58 would the come on a predetermined time prior to the red light 60 coming on and the sign 16 displaying "stop." The duration of the amber light 58 would depend upon the length of the obstruction zone among other factors, and would be programmable by the operator using the remote control 28.

It would be within the level of ordinary skill in the art to provide the appropriate push button controls on the remote control unit 28 to achieve all the various functions described herein.

Figure 7:
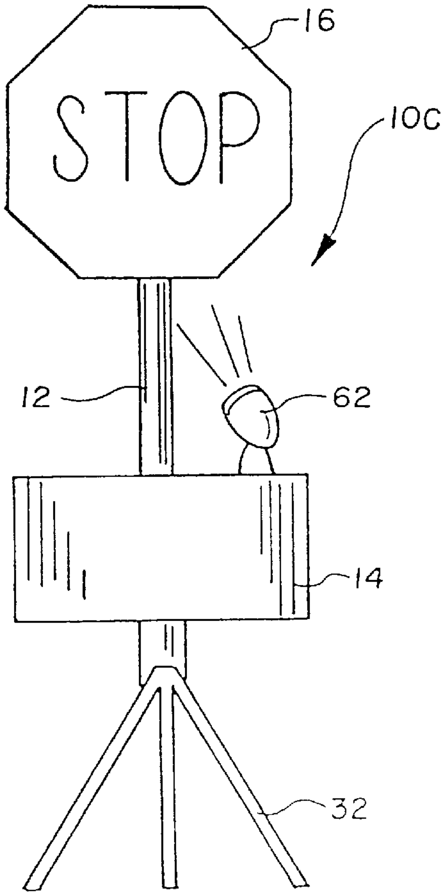
FIG. 7 is a diagrammatic depiction of the automated flagman of the present invention showing an alternative embodiment with an externally lighted sign, with the light fixed to the drive mechanism housing.

Referring to FIG. 7, a third alternative embodiment of the automated flagman 10*c* can be seen. The embodiment 10*c* is provided with a light source 62 that illuminates the sign 16 at night. Otherwise the embodiment 10*c* is identical to embodiment 10 in all respects. The light source 62 can have a local on/off button or be controlled remotely or both. The details of controlling the light source 62 are well known and will not be discussed in detail herein. In the embodiment 10*c* of the automated flagman, the light source 62 is supported by the drive mechanism housing 14.

Figure 8:
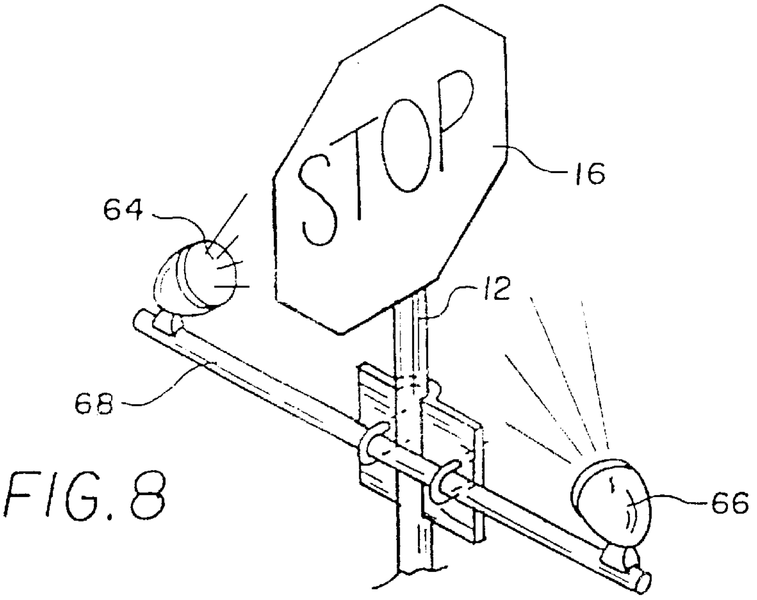
FIG. 8 is a fragmentary view of the automated flagman of the present invention showing an alternative embodiment with an externally lighted sign, with the lights fixed to the rotating support shaft of the automated flagman.

Referring to FIG. 8, an alternative method of illuminating the sign 16 is shown. Here, light sources 64 and 66 are supported on a rod 68. The rod 68 is fixed to the shaft 12 and rotates therewith. The lights 64 and 66 are positioned to constantly illuminate a respective side of the sign 16, and rotate in unison with the shaft 12. As with the light 62, the light sources 66 and 64 can have a local on/off button or be controlled remotely or both. The details of controlling the light sources 64 and 66 are well known and will not be discussed in detail herein.

Figure 9:
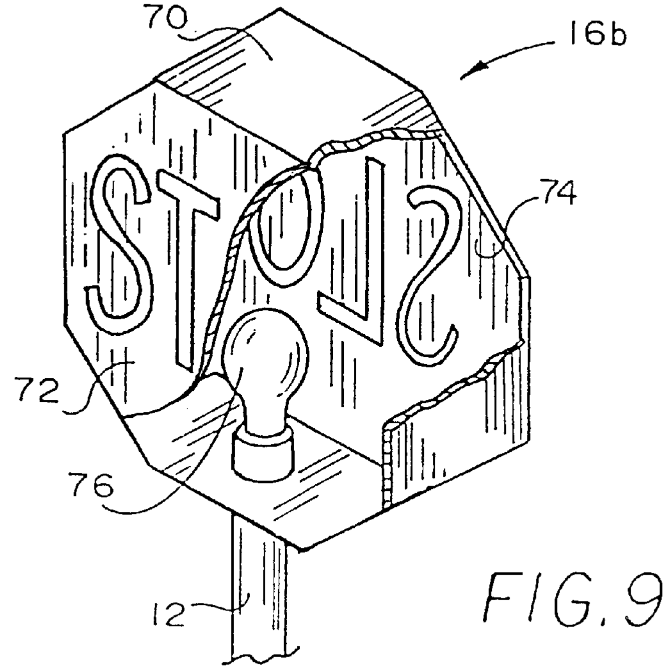
FIG. 9 is a fragmentary view of the automated flagman of the present invention showing an alternative embodiment with an internally lighted sign.

Referring to FIG. 9, an alternative type of stop/slow sign 16*b*, for use with the automated flagman of the present invention, can be seen. The sign 16*b* is internally lighted and is otherwise employed in a manner identical to sign 16. The sign 16*b* includes a housing 70 which houses at least one light bulb 76. One side 72 of the housing 70 carries the word “stop” while the other side 74 of the housing 70 carries the word “slow.” At least the sides 72 and 74 are transparent to some light such that the light from the bulb 76 can highlight and illuminate the words “stop” and “slow” so as to make those words readily apparent to observers at night. As with the other light sources discussed previously, the bulb 76 can have a local on/off button or be controlled remotely or both, and the details of controlling the light bulb 76 are well known in the art.

Figure 10:
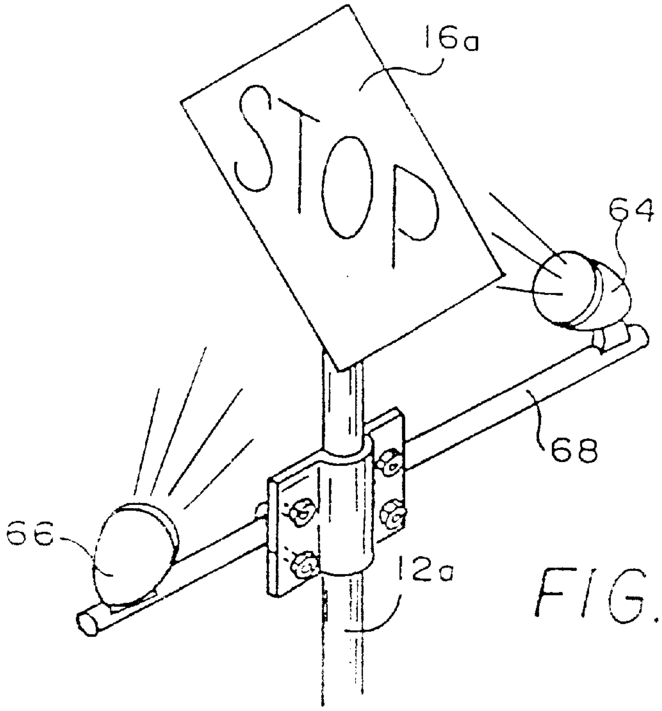
FIG. 10 is a fragmentary view of the automated flagman of the present invention showing an alternative embodiment with an externally lighted diamond-shaped sign.

Referring to FIG. 10, the system of FIG. 8 for illuminating the stop/slow sign is shown used in conjunction with the fabric or canvas sign 16*a*. As before, light sources 64 and 66 are supported on a rod 68. The rod 68 is fixed to the shaft 12*a* and rotates therewith. The lights 64 and 66 are positioned to constantly illuminate a respective side of the sign 16*a*, and rotate in unison with the shaft 12*a*. In all other respects the embodiments of FIGS. 8 and 10 are identical.

All the signs 16, 16*a*, 16*b* and 54 used in the various embodiments described above are configured to resemble the customary traffic control signs such that all members of the driving public will recognize the signs as signalling stop, slow, caution, proceed with caution, etc., and will act accordingly.

Figure 11:
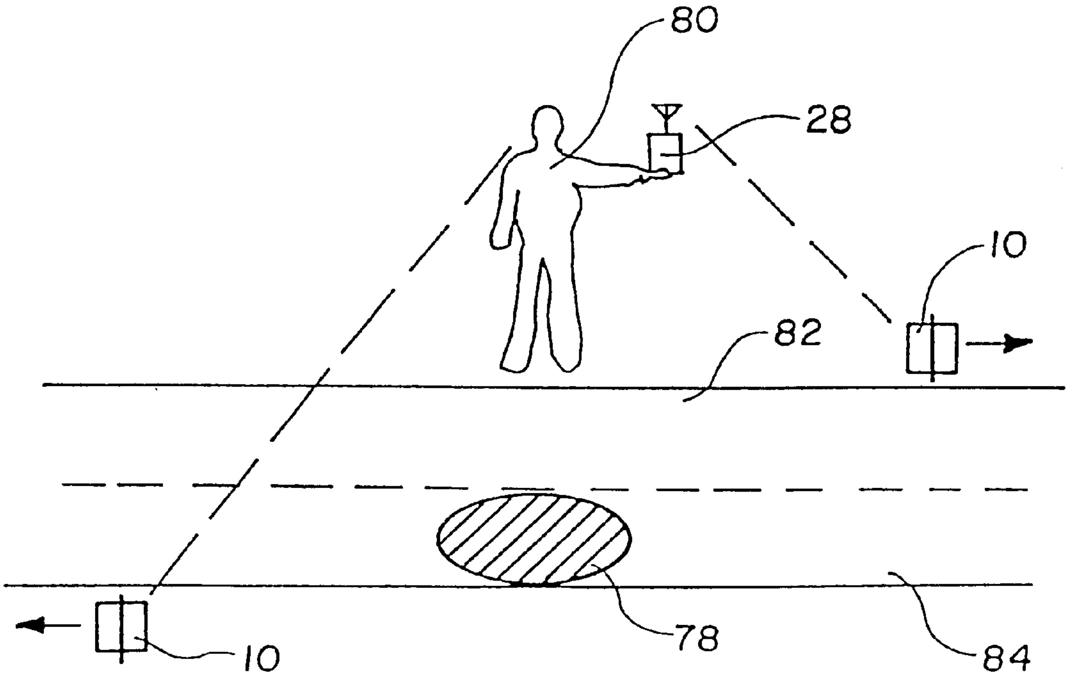
FIG. 11 is a diagrammatic depiction of two automated flagmen of the present invention being employed to direct traffic around an obstruction on a two lane road.

Referring to FIG. 11, two automated flagmen 10 are shown being employed to direct traffic around an obstruction 78 on a two lane road. The lane 84 is blocked by the obstruction 78 and all traffic must use the remaining open lane 82. In the situation depicted in FIG. 11, the operator 80 has both flagmen 10 in full view. One automated flagman 10 is positioned adjacent the open lane 82, while the second automated flagman is positioned adjacent the blocked lane 84. The automated flagmen 10 are positioned such that traffic approaching the obstruction on lane 82, from the left side of the operator 80, will see the word displayed by the automated flagman adjacent the lane 82; traffic approaching the obstruction on Lane 84, from the right side of the operator 80, will see the word displayed by the automated flagman adjacent the lane 84. The operator 80 uses the remote control unit 28 to set one automated flagmen to “stop” while the other automated flagman is set to display “slow,” allowing traffic to safely proceed through the single open lane 82 in a first direction. Periodically, the operator will change the automated flagman displaying “slow” to displaying “stop”, and he/she will wait until the last vehicle that was allowed to proceed in the first direction has cleared the open lane. The operator 80 then causes the automated flagman which initially displayed “stop” to now display “slow,” allowing traffic in the opposite direction to proceed safely through the open lane 82. This process is periodically repeated until the obstruction is cleared from the closed lane.

Figure 12:
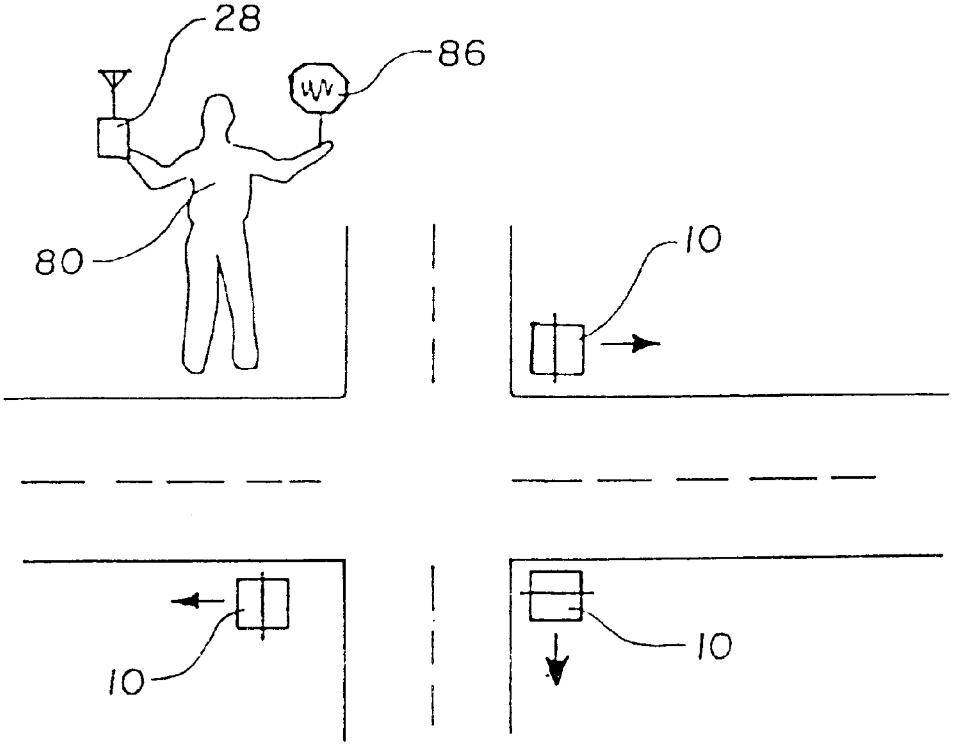
FIG. 12 is a diagrammatic depiction of three automated flagmen of the present invention being employed to direct traffic through a four-way intersection.

Referring to FIG. 12, three automated flagmen 10 of the present invention are seen being employed to direct traffic through a four-way intersection. The operator 80 uses his handheld stop/slow sign 86 to display “slow,” while he uses the remote control unit 28 to set all the automated flagmen 10 to “stop.” After some time, the operator changes the handheld sign 86 to “stop” and changes one of the three automated flagmen to “slow.” After some time, another of the automated flagmen is switched to “slow” while all the other automated flagmen and the handheld sign 86 display “stop.” Thus, at any given time, one of the group including the automated flagmen and the handheld sign 86, displays “slow” while all the others display “stop.” This process is repeated until every lane of traffic has had a chance to proceed through the intersection. The cycle of changing displays is completed when the handheld sign 86 is once again displaying “slow” while the automated flagmen display “stop.” This cycle is then repeated for as long as traffic control at the intersection is needed.

Figure 13:
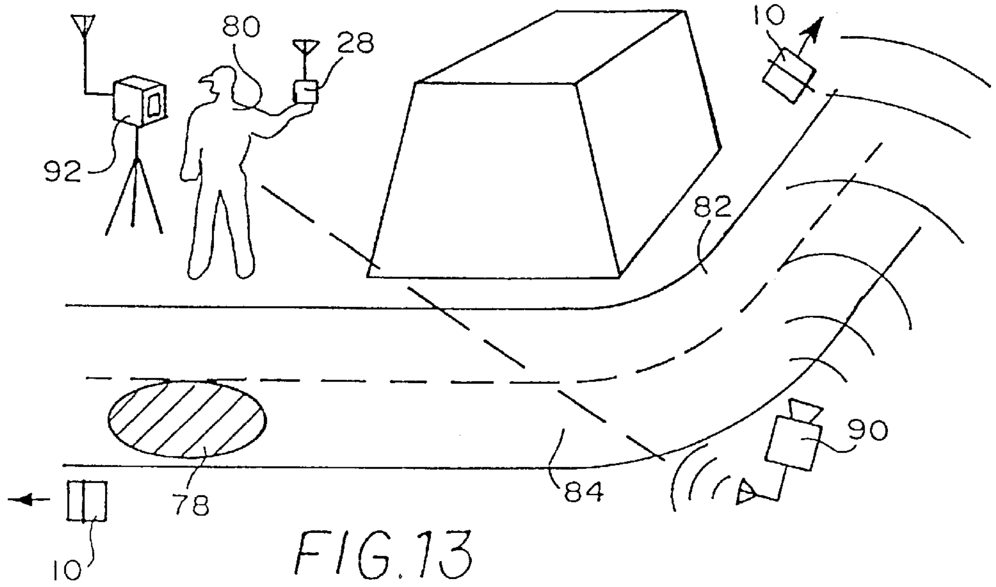
FIG. 13 is a diagrammatic depiction of two automated flagmen of the present invention being employed to direct traffic around an obstruction on a two lane road where the operator's view of one of the automated flagmen is obstructed.

Referring to FIG. 13, two automated flagmen 10 of the present invention are seen being employed to direct traffic around an obstruction 78 on a two lane road where the operator’s view of one of the automated flagmen is obstructed by an obstacle 88. The automated flagmen here are operated in exactly the same manner as the automated flagmen shown in FIG. 11, except that here the operator 80 cannot directly view the automated flagman adjacent the lane 82. In this situation, the operator 80 views the automated flagman adjacent lane 82 through a video or T.V. camera 90. Images from camera 90 are transmitted by radio waves to a T.V. monitor 92 which can be viewed by the operator 80. The operator 80 can then operate the automated flagmen as was described before in reference to FIG. 11. It is within the scope of the present invention to integrate monitor 92 within the handheld remote control unit 28. Also, the camera 90 may be integrated into the automated flagman 10. In addition, the images from camera 90 may be transmitted by any other well known wireless communications link or by a hard wire link when permitted by the particular situation.

Figure 14:
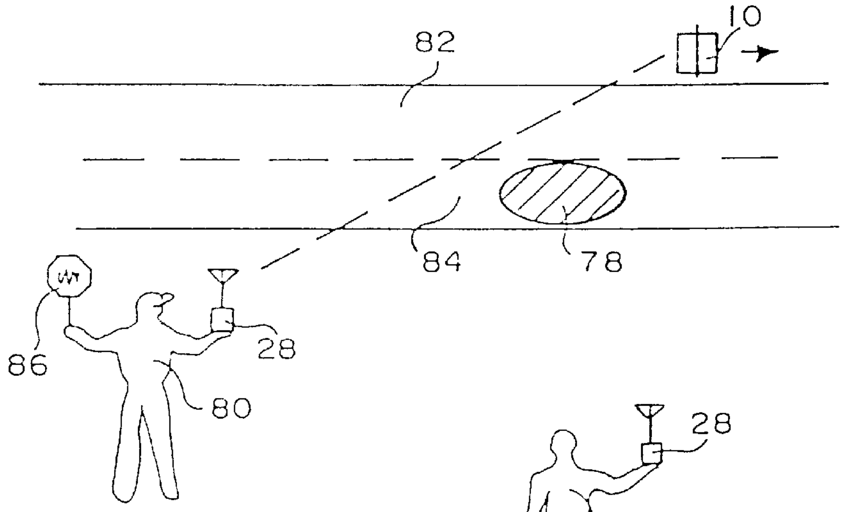
FIG. 14 is a diagrammatic depiction of a single automated flagman of the present invention being employed to direct traffic around an obstruction on a two lane road.

Referring to FIG. 14, a single automated flagman 10 of the present invention is seen being employed to direct traffic around an obstruction 78 on a two lane road. As was described with reference to FIG. 11, one automated flagman 10 is positioned adjacent the open lane 82, while the while the operator 80 takes the place of the second automated flagman using a handheld sign 86. The operator 80 positions himself adjacent the blocked lane 84. The operator 80 uses the remote control unit 28 to set the automated flagman 10 to “stop” while he displays “slow” with his handheld sign 86, thus allowing traffic to safely proceed through the single open lane 82 in a first direction. Periodically, the operator will change the handheld sign 86 to “stop”, and he/she will wait until the last vehicle that was allowed to proceed in the first direction has cleared the open lane. The operator 80 then causes the automated flagman to now display "slow," allowing traffic in the opposite direction to proceed safely through the open lane 82.

Figure 15:
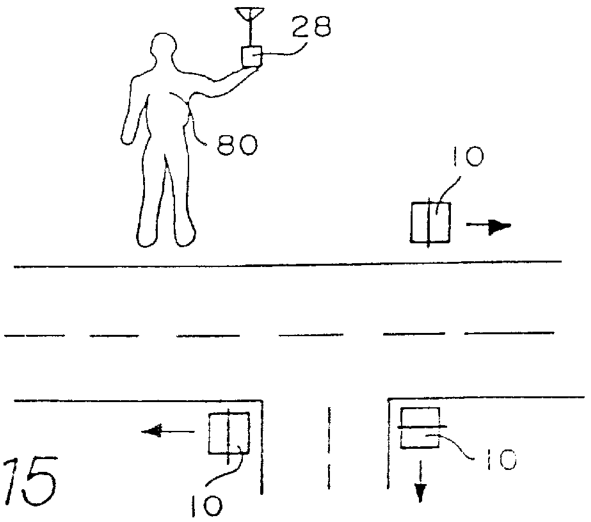
FIG. 15 is a diagrammatic depiction of three automated flagmen of the present invention being employed to direct traffic through a three-way intersection.

Referring to FIG. 15, three automated flagmen 10 of the present invention are seen being employed to direct traffic through a three-way intersection. Here, the operator 80 does not need to use a handheld sign. In a manner similar to that described in reference to FIG. 12, every few minutes, the operator changes one of the three automated flagmen to "slow" while all the others are made to display "stop." This process is repeated until every lane of traffic has had a chance to proceed through the intersection.

The stop/slow signs discussed in the foregoing description should be made reflective by using reflective material for either the indicia or the background, or both if sufficient contrast can be maintained. The control circuit 20 could additionally be provided with the capability to automatically control traffic without an operator. In fully automatic control, the control circuit 20 would include a timing circuit which can cause the sign to change after predetermined durations for the display of "stop" and "slow" (go). These durations would be set by the operator. Almost all items used in the construction of the automated flagman could if desired be purchased off the shelf. The battery 22 can be of the automotive or marine type and should provide twelve hours of operation on one charge.

The automated flagman can be made to be fail-safe by designing the control circuitry 20 such that the automated flagmen default to all stop if any malfunction is detected. In addition, the default to all stop, can be provided for by a mechanical biasing means such as a spring.

The operator control 28 should indicate to the operator the condition of each automated flagman, i.e. visually show the operator whether each automated flagman is displaying a "stop" or a "slow." An audible warning should be generated in case there is a conflict between some of the automated flagmen, i.e. the instructions displayed by the automated flagmen could bring vehicles into conflict with one another. All these functions can be provided using a microprocessor based control system, within the remote control unit 28, which can be programmed to control displays indicating status of each automated flagman and to detect and warn of conflicts. It would be within the level of ordinary skill in the art to implement all the various features outlined above using microprocessor based control systems and well known actuating mechanisms.

The automated flagman of the present invention will be useful to powerline companies, tree trimming operators, construction and utility crews, police at accident sites etc., and special event traffic control such as at concerts, sports events, etc.

Additionally, a pivoting crossing gate can be incorporated into the automated flagman in order to stop traffic physically. Although, this feature may detract from the portability of the automated flagman, in certain circumstances such a feature may be more desirable that having the degree of portability otherwise obtainable. As an added feature, the automated flagman may be provided with an interface to connect to an external power source such as a generator or a vehicle cigarette lighter so that such power sources may alternatively be utilized when these sources are available.

I claim:

1. A portable traffic control device comprising:

a sign with a first and a second side, said first side having indicia forming a first word, said first word being stop, said second side having indicia forming a second word, said second word being slow;

means for illuminating said sign;

a shaft having a top end and a bottom end, the top end of said shaft being attachable to said sign;

a housing affixed to the bottom end of said shaft;

a drive mechanism housed at least in part within said housing, said shaft being engageable with said drive mechanism, wherein said drive mechanism acts to rotate said sign about one hundred and eighty degrees;

a control system housed within said housing, said control system controlling actuation of said drive mechanism; and a collapsible tripod having legs vertically extending from and attachable to said housing to support said housing at a predetermined height above a supporting ground surface when said portable traffic control device is deployed to control traffic.

2. The portable traffic control device according to claim 1, wherein said sign is an octagonal sign.

3. The portable traffic control device according to claim 2, further comprising:

a remote control unit capable of communicating commands from an operator to said control system to thereby allow the operator to control said portable traffic control device from a remote location.

4. The portable traffic control device according to claim 3, wherein said means for illuminating comprises:

a light source attached to said housing, said light source being positioned such that one of said first side of said sign and said second side of said sign can be selectively illuminated by said light source when said one of said first side of said sign and said second side of said sign faces in a direction which exposes said one of said first side of said sign and said second side of said sign to light projected from said light source.

5. The portable traffic control device according to claim 3, wherein said means for illuminating comprises:

an elongated bar attachable to said shaft, said bar having a first end and a second end;

a first light source attached to said bar proximate said first end of said bar, said first light source projecting light onto said first side of said sign when said bar is attached to said shaft; and a second light source attached to said bar proximate said second end of said bar, said second light source projecting light onto said second side of said sign when said bar is attached to said shaft.

6. The portable traffic control device according to claim 3, wherein said octagonal sign comprises:

a first translucent octagonal plate having indicia forming said first word;

a second translucent octagonal plate having indicia forming said second word, said second translucent octagonal plate being in registry with said first translucent octagonal plate and said second translucent octagonal plate being spaced apart from said first translucent octagonal plate;

a peripheral wall extending between said second translucent octagonal plate and said first translucent octagonal plate; and a light bulb placed intermediate said second translucent octagonal plate and said first translucent octagonal plate, whereby said light bulb can illuminate said sign for better visibility.

7. The portable traffic control device according to claim 3, wherein said octagonal sign is formed at least in part by a solid octagonal plate having said first word on a first side thereof and said second word on a second side thereof.

8. The portable traffic control device according to claim 1, wherein said sign is in the form of a flexible sheet supported by a frame and has indicia on said second side thereof forming a second word, said second word being slow.

9. The portable traffic control device according to claim 1, wherein said sign comprises:

a first bar having a first end and a second end;

a second bar having a first end, a second end, and a length, said second bar being pivotally attached to said first bar at a pivotal attachment, said pivotal attachment being located about midway along said length of said second bar and a first distance from said first end of said first bar, said first distance being about half said length of said second bar, said first and second bars defining a frame;

a diamond shaped woven fabric sheet having a first side and a second side, said woven fabric sheet having said first word formed on said first side thereof, said woven fabric sheet having a first corner, a second corner, a third corner, and a fourth corner; and means for maintaining said woven fabric sheet stretched over said frame with said first corner being positioned proximate said first end of said first bar, said second corner being positioned proximate said first end of said second bar, said third corner being positioned along said first bar about said first distance away from said pivotal attachment, and said fourth corner being positioned proximate said second end of said second bar.

10. A portable traffic control device comprising:

a sign with a first and a second side, said first side having indicia forming a first word, said first word being stop, said second side having indicia forming a second word, said second word being slow;

means for illuminating said sign;

a shaft having a top end and a bottom end, the top end of said shaft being attachable to said sign;

a housing affixed to the bottom end of said shaft, said housing rotatably supporting said shaft;

an electric motor housed within said housing;

a battery electrically communicating with said electric motor and providing electrical energy to said motor;

power transmission means for transmitting rotational motion from said electrical motor to said shaft, said shaft being engaged to said power transmission means;

a control system housed within said housing, said control system controlling operation of said electrical motor; and a collapsible tripod having legs vertically extended from and releasibly attached to said housing to support said housing at a predetermined height above a supporting ground surface when said portable traffic control device is deployed to control traffic.

11. A portable traffic control system comprising:

a portable traffic control device including:

a sign with a first and a second side, said first side having indicia forming a first word, said first word being stop, said second side having indicia forming a second word, said second word being slow;

a shaft having a top end and a bottom end, the top end of said shaft being attachable to said sign;

a housing affixed to the bottom end of said shaft;

a drive mechanism housed at least in part within said housing, said shaft being engageable with said drive mechanism, wherein said drive mechanism acts to rotate said sign about one hundred and eighty degrees;

a control system housed within said housing, said control system controlling actuation of said drive mechanism; and a collapsible tripod having legs vertically extending from and attachable to said housing to support said housing at a predetermined height above a supporting ground surface when said portable traffic control device is deployed to control traffic;

a video camera; and a video monitor communicating with said video camera, whereby an operator can observe said portable traffic control device from a remote location.

* * * * *